United States Patent
Dowty et al.

(10) Patent No.: US 11,952,127 B2
(45) Date of Patent: Apr. 9, 2024

(54) PASSENGER SEAT ARRANGEMENT FOR SOCIALIZATION AND ACCESS FOR PERSONS OF REDUCED MOBILITY

(71) Applicant: B/E Aerospace, Inc., Winston-Salem, NC (US)

(72) Inventors: Mark B. Dowty, Rural Hall, NC (US); Tracy N. Pence, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/894,646

(22) Filed: Aug. 24, 2022

(65) Prior Publication Data

US 2023/0064972 A1    Mar. 2, 2023

Related U.S. Application Data

(60) Provisional application No. 63/237,893, filed on Aug. 27, 2021.

(51) Int. Cl.
*B64D 11/06* (2006.01)

(52) U.S. Cl.
CPC ........ *B64D 11/064* (2014.12); *B64D 11/0601* (2014.12); *B64D 11/0606* (2014.12)

(58) Field of Classification Search
CPC .............. B64D 11/064; B64D 11/0601; B64D 11/0606
See application file for complete search history.

(56) References Cited

U.S. PATENT DOCUMENTS

| | | | |
|---|---|---|---|
| 4,157,797 A | 6/1979 | Fox | |
| 7,721,991 B2 | 5/2010 | Johnson | |
| 9,248,759 B2 | 2/2016 | Brand et al. | |
| 10,773,607 B2 | 9/2020 | Akaike et al. | |
| 2015/0145300 A1 | 5/2015 | Finlay et al. | |
| 2022/0204165 A1* | 6/2022 | Chilcott ............. | B64D 11/0606 |

FOREIGN PATENT DOCUMENTS

| | | |
|---|---|---|
| CN | 110834732 A | 2/2020 |
| EP | 1693245 A2 | 8/2006 |
| EP | 3546357 A1 | 10/2019 |
| WO | 2003013903 A1 | 2/2003 |
| WO | 2018078377 A1 | 5/2018 |

\* cited by examiner

*Primary Examiner* — Anthony D Barfield
(74) *Attorney, Agent, or Firm* — Suiter Swantz pc llo (57) ABSTRACT

A passenger seat arrangement for a vehicle including first and second partition walls positioned in spaced apart relation forming an area therebetween, each of the walls including at least a portion angled relative to an aisle and each of the walls having an end position proximate the aisle such that the area formed between the walls is directly accessible from the aisle. A passenger seat positioned in the area is coupled to a guide mechanism such that the passenger seat is configured to travel within the area between a first position distal from the aisle and a second position proximate the aisle for facilitating transfer of a person of reduced mobility (PRM), and in some implementations through an intermediate position for enhancing socialization between the passenger seat and an adjacent passenger seat.

15 Claims, 6 Drawing Sheets

PASSENGER SEAT ARRANGEMENT FOR SOCIALIZATION AND ACCESS FOR PERSONS OF REDUCED MOBILITY

CROSS-REFERENCE AND INCORPORATION BY REFERENCE

This nonprovisional patent application claims the benefit of priority of U.S. Application No. 63/237,893 filed Aug. 27, 2021 for PASSENGER SEAT ARRANGEMENT FOR SOCIALIZATION AND ACCESS FOR PERSONS OR REDUCED MOBILITY, the entirety of which is incorporated by reference.

TECHNICAL FIELD AND BACKGROUND

The present disclosure relates generally to passenger seat arrangements for vehicle cabins, and more particularly, to business class passenger seat arrangements including a passenger seat repositionable for socialization and access for persons of reduced mobility (PRM).

Vehicle cabins such as aircraft passenger cabins commonly include both economy and premium seating classes. Passenger seats in economy seating classes are typically configured in fixed rows. While each row can include a single seat, rows more commonly include two or more seats positioned side-by-side with each seat oriented parallel to the longitudinal aircraft axis. Business class, because of its lesser seat density as compared to economy class, offers greater flexibility in terms of seat positioning. For example, passenger seats in business classes may be grouped together in unique arrangements and/or separated by partition walls, and seats may be positioned parallel or angled relative to the longitudinal aircraft axis.

One particular business class passenger seat arrangement, commonly referred to as a "herringbone" passenger seat arrangement, includes parallel passenger seats oriented at an angle relative to the longitudinal aircraft axis. Seat angles may be shallow when implemented in wide-body aircraft considering the greater width of the passenger cabin. When implemented in narrow-body aircraft, seat angles tend to steepen in order to configure the passenger seats into two columns of passenger seats separated by a longitudinal aisle. Herringbone seating arrangements can include privacy walls positioned between adjacent seats to enhance privacy. When herringbone seat arrangements are implemented in an aircraft cabin with both a steep seat angle and privacy walls, seat access becomes more problematic, particularly for PRMs.

One solution for seat access in the aforementioned configuration requires a movable wall portion positioned adjacent the aisle, wherein the wall moves from a first position wherein the access opening to the seat is narrow for passengers without mobility issues, to a second position wherein the access opening widens to facilitate seat ingress and egress for PRMs. While seat access is facilitated by providing a widenable access opening, the solution requires a complicated partition configuration, movable parts which add to the complexity of the seat arrangement, and encroachment of the moving wall portion into the living space of the adjacent passenger when the wall is in the second position.

The aforementioned solution further requires a seat which is repositionable between an upright sitting position and a lie-flat sleeping position, as well as an extendable leg rest, wherein at least one of the seat pan and the leg rest moves forward toward the aisle to shorten the distance between the seat component and the aisle to facilitate transfer of the PRM from the aisle to their respective seat. Such a solution requires that the seat bottom translate forward toward the aisle when the seat repositions, which requires a complex seat construction to provide the necessary seat pan travel. In addition, when the leg rest is extended to horizontal to facilitate transfer, it is difficult to transfer the PRM over the leg rest and to the seat pan.

Accordingly, what is needed is a PRM seat access solution for herringbone passenger seat arrangements and other business class seat arrangements that overcomes the disadvantages of prior art solutions. It would further be desirable for the PRM access solution to provide an additional benefit when not utilized for PRM passenger access, for instance enhancing the possibility of socialization between adjacent passengers, among other benefits.

BRIEF SUMMARY

In one aspect, embodiments of the inventive concepts disclosed herein are directed to a passenger seat arrangement for a vehicle including a longitudinal axis and at least one longitudinal aisle. The seat arrangement includes first and second partition walls positioned in spaced apart relation forming an area therebetween, each of the first and second partition walls includes at least one portion angled relative to the longitudinal aisle, each of the first and second partition walls having one end positionable proximate the longitudinal aisle, and the area formed between the first and second partition walls directly accessible from the longitudinal aisle. A passenger seat positioned in the area is oriented generally facing the longitudinal aisle. A guide mechanism positioned in the area, coupled to the passenger seat, guides movement of the passenger seat within the area and relative to the longitudinal aisle. The passenger seat is configured to travel along the guide mechanism between a first position in which the passenger seat is positioned distal from the longitudinal aisle, and a second position in which the passenger seat is positioned proximate the longitudinal aisle, for example, to facilitate transfer of a PRM from a wheelchair to their respective passenger seat.

In some embodiments, the at least one portion of each of the first and second partition walls is fixed in its respective angle relative to the longitudinal aisle, such that an access opening formed between the one end of each of the first and second partition walls postionable proximate the longitudinal aisle has a fixed width, wherein the access opening provides access from the longitudinal aisle to the area.

In some embodiments, the guide mechanism includes at least one floor track positioned in the area, wherein the passenger seat is movably coupled to the at least one floor track such that the passenger seat is configured to track along the at least one floor track between the first and second positions.

In some embodiments, each of the first and second partition walls includes a first portion and a second portion angled relative to the first portion, the first portion of each of the first and second partition walls is positionable at a first angle relative to the longitudinal aisle and the second portion of each of the first and second partition walls is positionable at a second angle relative to the longitudinal aisle, wherein the second angle is greater than the first angle, the at least one floor track includes a first portion and a second portion angled relative to the first portion, and the first portion of the at least one floor track is positioned at a first angle relative to the longitudinal aisle and the second portion of the at least one floor tack is positioned at a second angle relative to the longitudinal aisle, wherein the second angle is greater than the first angle.

In some embodiments, the guide mechanism includes first and second wall tracks coupled to the respective first and second partition walls, wherein the passenger seat is movably coupled to the first and second walls tracks such that the passenger seat is configured to track along the first and second wall tracks between the first and second positions.

In some embodiments, each of the first and second partition walls includes a first portion and a second portion angled relative to the first portion, the first portion of each of the first and second partition walls is positionable at a first angle relative to the longitudinal aisle and the second portion of each of the first and second partition walls is positionable at a second angle relative to the longitudinal aisle, wherein the second angle is greater than the first angle, each of the first and second wall tracks includes a first portion and a second portion angled relative to the first portion, and the first portion of each of the first and second wall tracks is positioned at a first angle relative to the longitudinal aisle and the second portion of each of the first and second wall tracks is positioned at a second angle relative to the longitudinal aisle, wherein the second angle is greater than the first angle.

In some embodiments, the passenger seat is configured to transition between an upright sitting position and a reclined sitting position, wherein the passenger seat is configured to travel along the guide mechanism when the passenger seat is in the upright sitting position or in the reclined sitting position.

In some embodiments, the passenger seat is coupled to the guide mechanism via a swivel mechanism for rotating the passenger seat relative to the guide mechanism.

In some embodiments, the passenger seat is configured to rest in an intermediate position between the first and second positions.

According to another aspect, the present disclosure provides a passenger seat arrangement for an aircraft passenger cabin including an aisle, and first and second partition walls positioned in spaced apart relation forming a first area therebetween, each of the first and second partition walls including at least one portion angled relative to the aisle, each of the first and second partition walls having one end positioned proximate the aisle, and the first area formed between the first and second partition walls directly accessible from the aisle. A first passenger seat is positioned in the first area and oriented generally facing the aisle, a guide mechanism positioned in the first area, coupled to the first passenger seat, guides movement of the passenger seat within the first area and relative to the aisle. A third partition wall is positioned parallel and in spaced apart relation to the first partition wall, the third and first partition walls forming a second area therebetween, the third partition wall including at least one portion angled relative to the aisle, the third partition wall having one end positioned proximate the aisle, and the second area formed between the third and first partition walls directly accessible from the aisle. A second passenger seat is positioned in the second area and oriented generally facing the aisle. The first passenger seat is configured to travel along the guide mechanism between a first position in which the first passenger seat is positioned distal from the aisle and a second position in which the first passenger seat is positioned proximate the aisle, through a third position in which the first and second passenger seats are positioned laterally adjacent and aligned. The second seat may or may not be fixed in position within the second area.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to passenger seat arrangements for a vehicle cabin, for instance business class passenger seat arrangements for an aircraft passenger cabin. Particular embodiments are directed to herringbone style passenger seat arrangements in which the passenger seats are positioned at an angle (i.e., not parallel or perpendicular) relative to the longitudinal aircraft axis, for instance at an angle relative to an adjacent longitudinal aisle. The present disclosure is not limited to the particular passenger seat arrangements shown, and passenger seat arrangements other than those shown may benefit from the elements, features of functionalities of the passenger seat arrangements disclosed herein.

With reference to FIGS. 1-6, a passenger seat arrangement 100 according to the present disclosure generally includes a plurality of passenger seats 102 oriented substantially parallel to each other. Each passenger seat 102 may be angled relative to a nearest aisle 104, for instance a longitudinal aisle separating passenger seat columns. Each passenger seat 102 may be configured to transition between an upright sitting position for taxi, takeoff and Landing (TTOL) and a reclined sitting position to enhance comfort during flight. In some embodiments, each passenger seat 102 may transition to a horizontal bed. The mechanism for transitioning each passenger seat 102 between the upright sitting position, the reclined sitting position, and in some cases a horizontal bed is not critical to the present disclosure and therefore various conventional mechanisms for achieving the transitions may be utilized. In some embodiments, each passenger seat 102 includes a seat bottom 106 and a seat back 108. In other embodiments, and particularly in the case of fully reclinable seats, each passenger seat 102 may include a leg rest (not shown).

First and second partition walls 110, 112 positioned in spaced apart relation define an area 114 therebetween. In embodiments, the area 114 includes space for positioning the seat and opening floor space along which the seat travels. Each of the first and second partition walls 110, 112 may carry, support, form or partially form one or more of a video monitor, console, desk, footwell, table, other passenger amenity, etc., also not critical to the present disclosure. Each partition wall 110, 112 includes at least one portion angled relative to the longitudinal aisle 104 and has one end positionable proximate the longitudinal aisle. The area 114 formed between the first and second partition walls 110, 112 is directly accessible from the longitudinal aisle 104. Within each area 114 is positioned one passenger seat 102 oriented generally facing the longitudinal aisle, for instance facing in the general direction of the aisle but at an angle thereto.

A guide mechanism 116 is positioned in the area 114 and the passenger seat 102 is movably coupled to the guide mechanism such that the guide mechanism guides travel of the passenger seat within the area and relative to the longitudinal aisle 104. With specific reference to FIGS. 1-3, the passenger seat 102 is configured to travel or track along the guide mechanism 116 between a first position in which the passenger seat is positioned distal from the longitudinal aisle 104, and a second position in which the passenger seat is positioned proximate the longitudinal aisle, for example, to facilitate transfer of a PRM. In some embodiments, the first position corresponds to a TTOL and flight seat position and the second position corresponds to a temporary transfer position not compliant for TTOL. In embodiments, the seat is configured to be positioned at any point along the guide mechanism 116.

Figure 1:
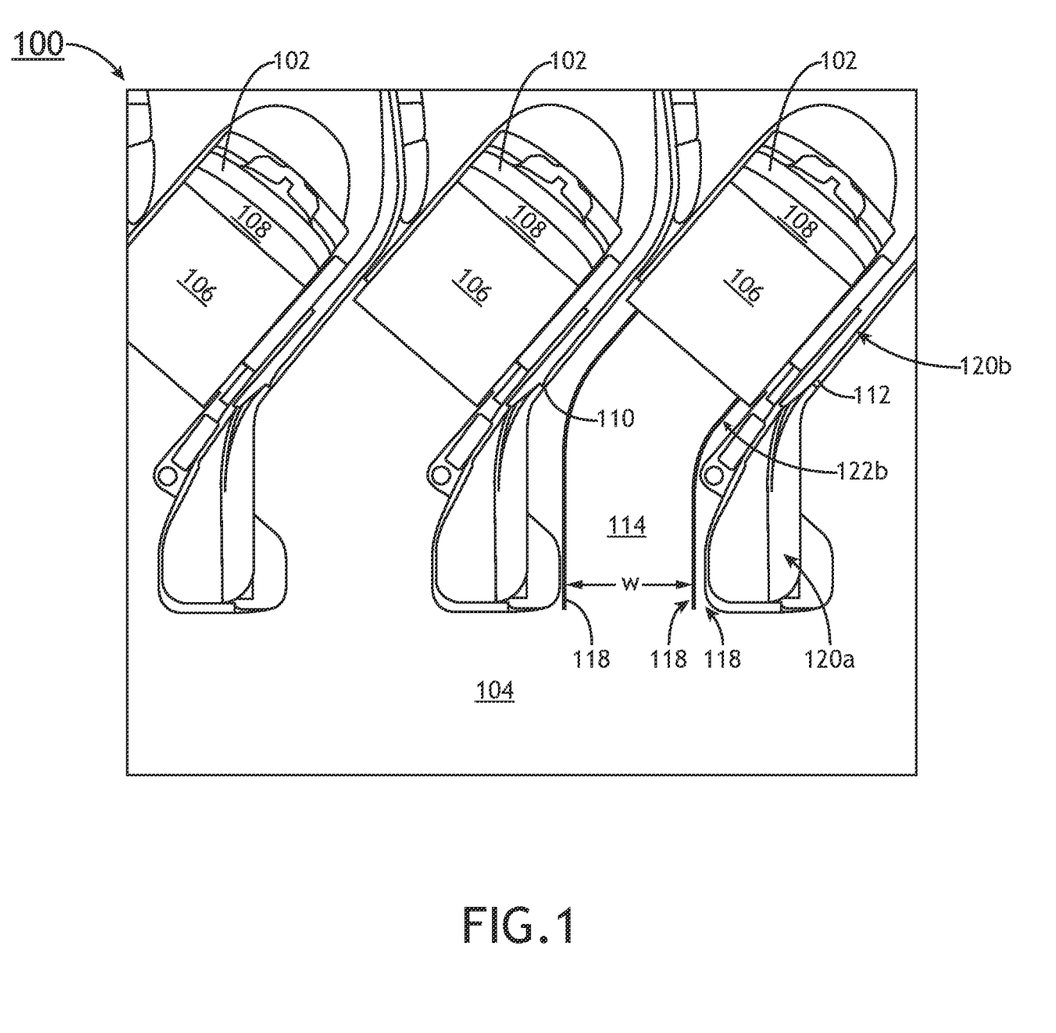
FIG. 1 is a top plan view of a passenger seat arrangement for a vehicle cabin showing all seats in their upright (e.g., taxi, takeoff and landing (TTOL)) seat position.
Figure 2:
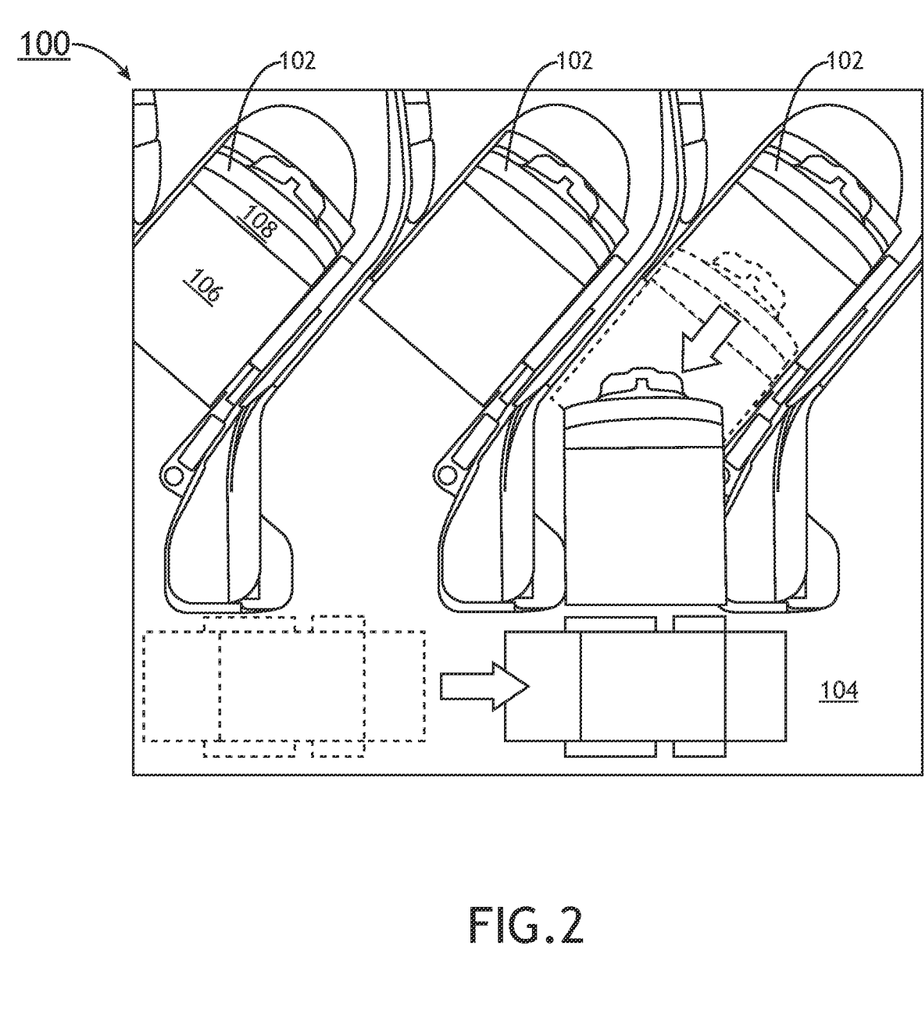
FIG. 2 is a top plan view of the passenger seat arrangement of FIG. 1 showing one of the passenger seats traveling forward to facilitate transfer of a PRM.
Figure 3:
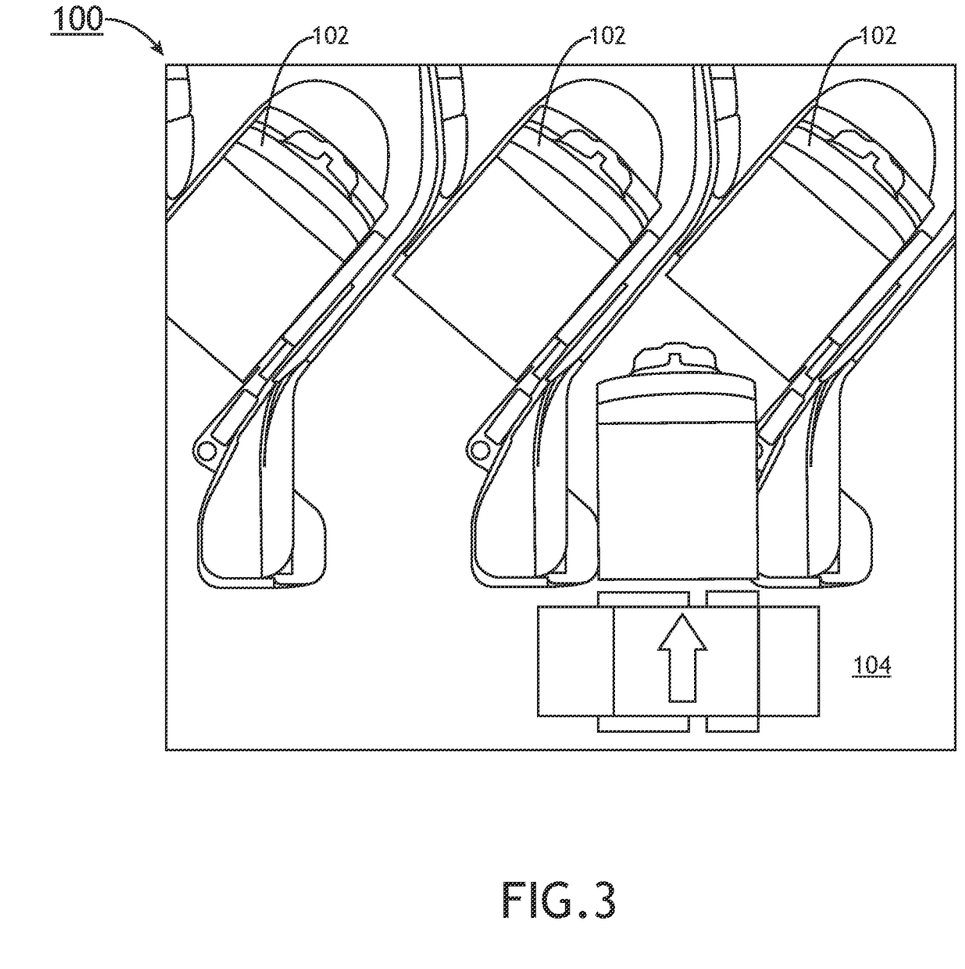
FIG. 3 is a top plan view of a portion of the passenger seat arrangement of FIG. showing the traveled passenger seat in a fully forward position ready for PRM transfer from a wheelchair parked in the aisle.

In some embodiments, the at least one portion of each of the first and second partition walls 110, 112 is fixed in its respective angle relative to the longitudinal aisle, such that an access opening w formed between the one end of each of the first and second partition walls positioned proximate the longitudinal aisle 104 has a fixed width for providing access from the longitudinal aisle to the area 114.

In some embodiments, the guide mechanism includes at least one floor track 118, and in some embodiments spaced parallel floor tracks 118, positioned in the area 114, wherein the passenger seat 102 is movably coupled to the at least one floor track such that the passenger seat is configured to track along the at least one floor track between the first position for TTOL and/or during flight, and the second position to facilitate transfer of the PRMr.

In some embodiments, each of the first and second partition walls 110, 112 includes a first portion 120a and a second portion 120b angled relative to the first portion. The first portion 120a of each of the first and second partition walls 110, 112 is positioned at a first angle relative to the longitudinal aisle 104, and the second portion 102b of each of the first and second partition walls is positioned at a second angle relative to the longitudinal aisle, wherein the second angle is greater than the first angle. In some embodiments, the at least one floor track 118 includes a first portion 122a and a second portion 122b angled relative to the first portion, with the first portion oriented at a first angle relative to the longitudinal aisle and the second portion oriented at a second angle relative to the longitudinal aisle, and also wherein the second angle is greater than the first angle. In some embodiments, the at least one guide track 118 follows its corresponding linear and curved portions of the partition walls 110, 112.

In some embodiments, the guide mechanism 118 can include multiple tracks with the multiple tracks coupled to the respective first and second partition walls, wherein the passenger seat 102 is movably coupled to the first and second walls tracks such that the passenger seat is configured to track along the first and second wall tracks between the first and second positions.

Figure 4:
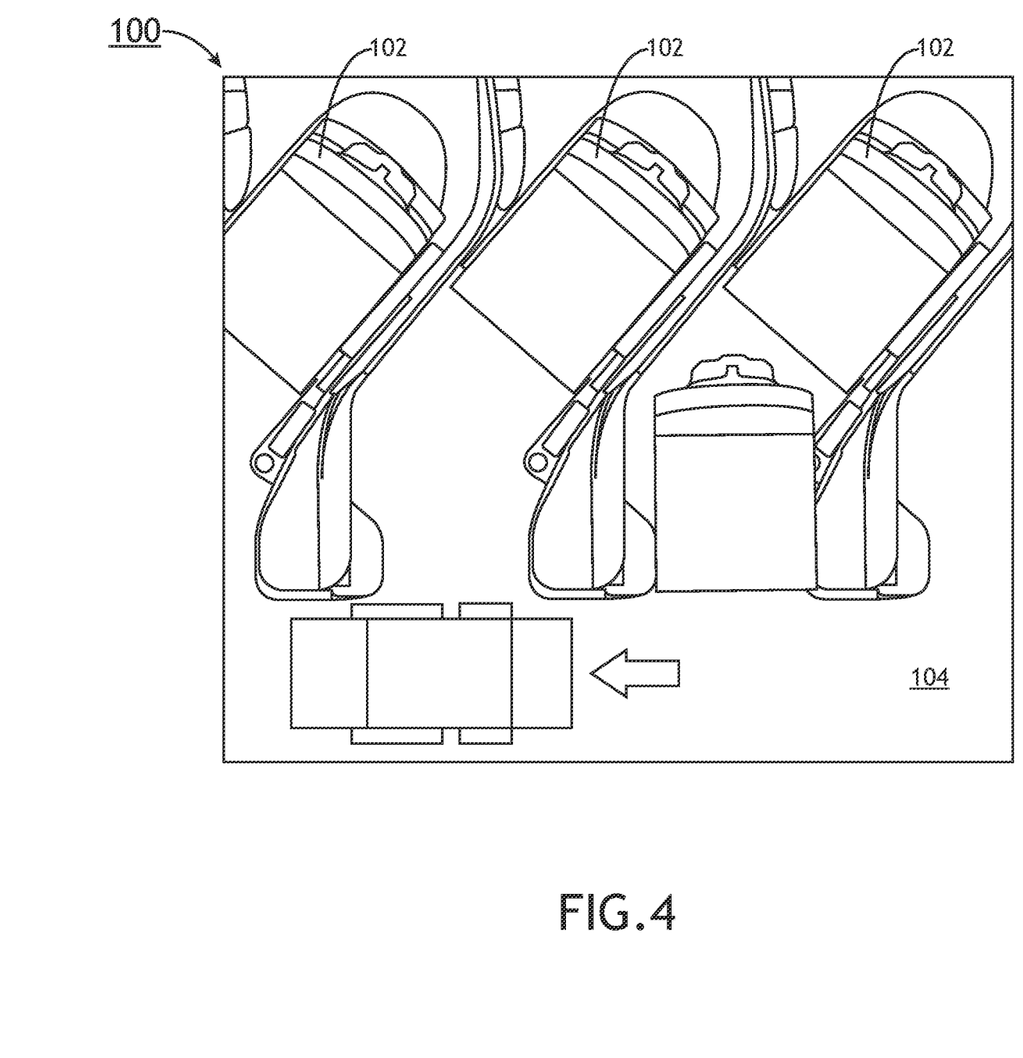
FIG. 4 is a top plan view of the passenger seat arrangement of FIG. 3 showing the traveled seat in the fully forward position and the wheelchair traveling down the aisle.
Figure 5:
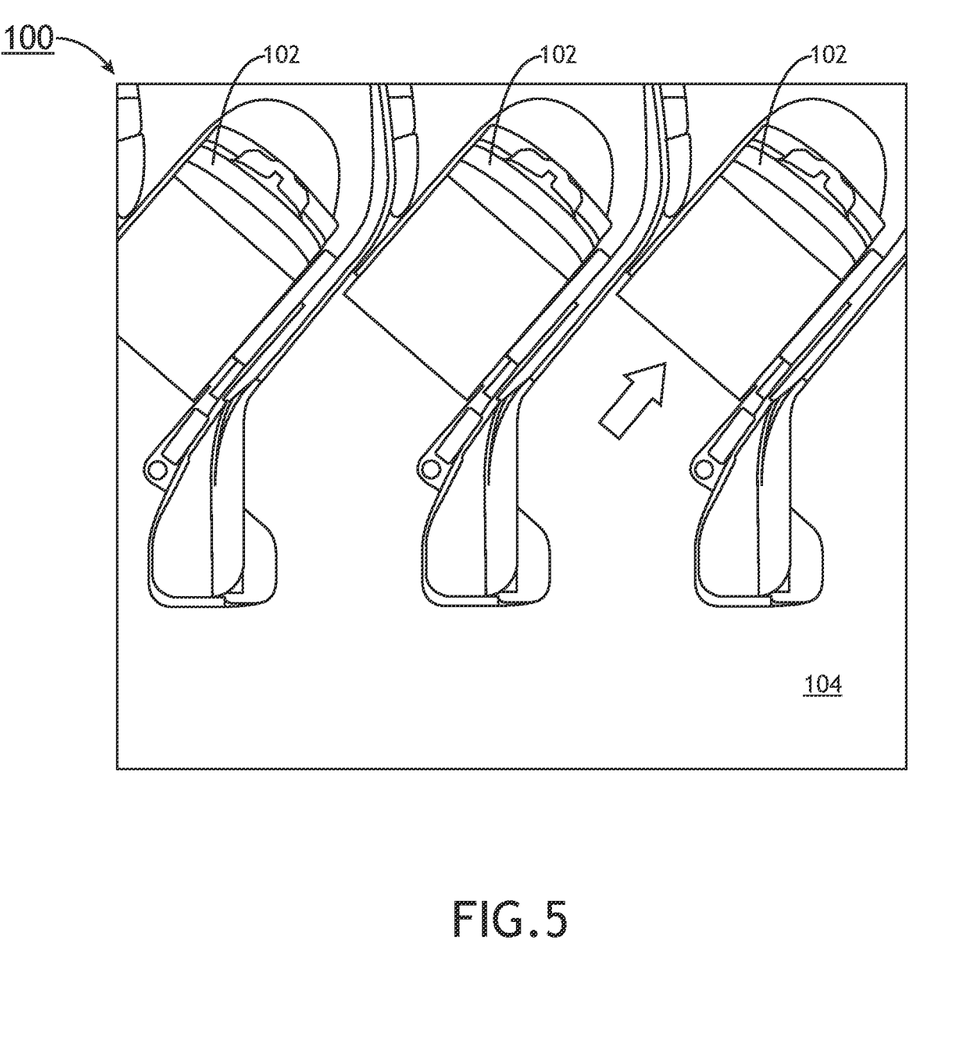
FIG. 5 is a top plan view of the passenger seat arrangement of FIG. 3 showing the traveling passenger seat returned to the starting position and upright.

As discussed above, the passenger seat 102 may be configured to transition between an upright sitting position and a reclined sitting position and/or a horizontal bed but may be required to be in the upright sitting position to track into the fully 'forward' second seat position for transfer. With specific reference to FIG. 2, this figure shows a wheelchair of the like traversing down the longitudinal aisle 104 to arrive at the designated seat position, and with the passenger seat 102 tracking 'forward' toward the longitudinal aisle 104. As the passenger seat 102 moves from the first position required for TTOL, to the second position for transfer, the seat angle changes such that the passenger seat, when fully in the second position, is perpendicular or substantially perpendicular to the longitudinal aisle 104. As such, the seat angle between the first position and the second position may be said to 'increase' to position the passenger seat 102 proximate the aisle 104 and at an optimal angle for transfer. FIG. 3 shows the passenger seat 102 fully in the second position in alignment with the wheelchair or the like to facilitate transfer from the wheelchair or the like to the passenger seat. FIG. 4 shows the passenger seat fully forward and the wheelchair leaving the access opening. Finally, FIG. 5 shows the passenger seat 102, presumably occupied, returned to the first position for TTOL or use during flight.

In some embodiments, the passenger seat may be coupled to the guide mechanism 118 via a swivel mechanism for rotating the passenger seat relative to the guide mechanism and/or relative to the area 114.

Figure 6:
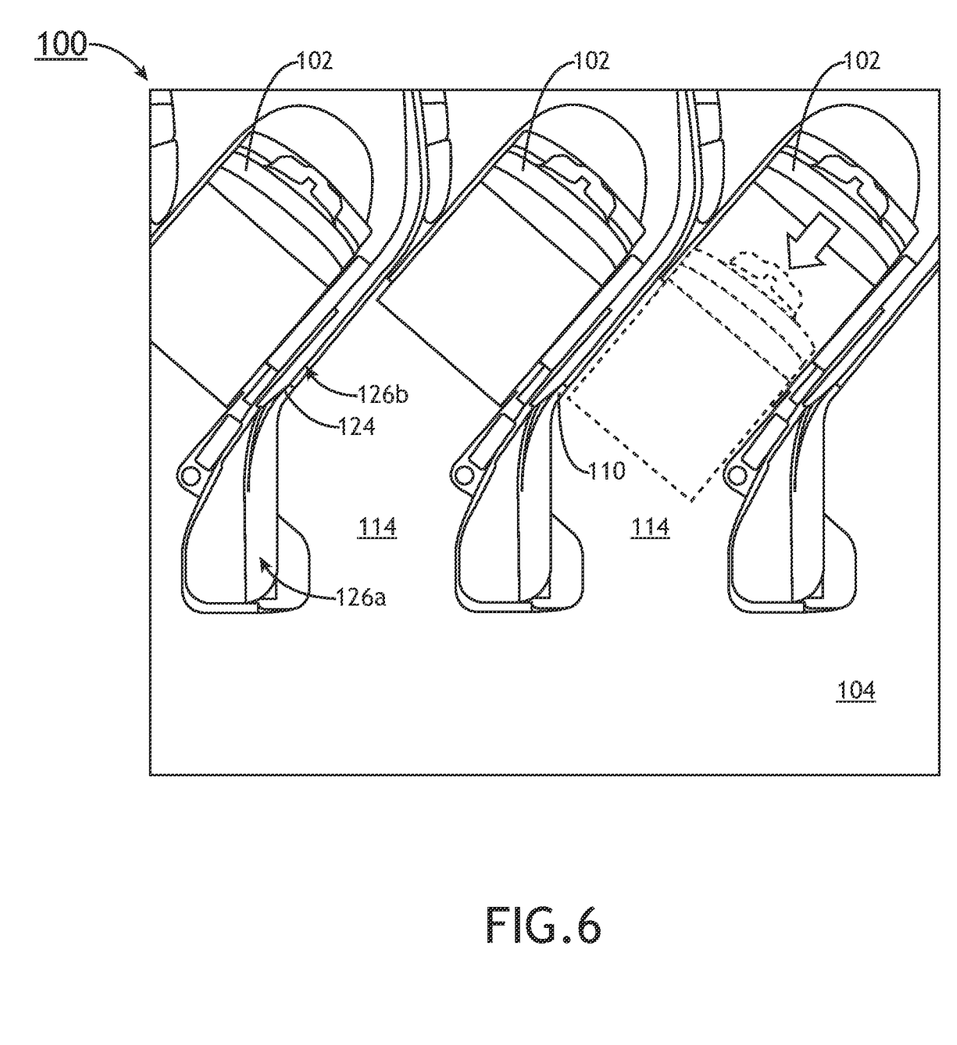
FIG. 6 is a top plan view of the passenger seat arrangement of FIG. 1 showing one of the passenger seats traveled forward to a socialization enhancing seat position.

With reference to FIG. 6, in addition to the first and second positions for TTOL and transfer, respectively, the passenger seat 102 may be moved and come to rest in a third position corresponding to an intermediate or socialization position. When positioned substantially laterally adjacent to another seat, for instance at substantially the same seat angle, a third partition wall 124 is positioned parallel and in spaced apart relation to the first partition wall 110 such that the third and first partition walls form a second area 114 therebetween. The third partition wall 124, like each of the first and second partition walls 110, 112, includes at least one portion angled relative to the aisle and one end positioned proximate the aisle, with the second area 114 formed between the third and first partition walls directly accessible from the aisle. The second passenger seat 102 is positioned in the second area 114 and oriented generally facing the aisle. The first passenger seat 102 is configured to travel along the guide mechanism from either of the first or second positions to the third position such that the passenger seats in the first and second areas are laterally adjacent and aligned. In embodiments in which a portion of the passenger wall between the aligned seats is missing or movable to a stowed position, the seat alignment facilitates eye contact and socializing between the adjacent passengers. In embodiments including a plurality of passenger seats, such as the two or more passenger seats shown in the figures, one or more of the seats may be configured with the guide mechanism and ability to track the seat to the second position. In some embodiments, based on the total number of passenger seats, the aircraft may be equipped with the number of handicap accessible seats required to comply with DOT requirements.

In further embodiments, the seat bottom may decouple from the backrest such that the seat bottom travels forward to the transfer position while the backrest remains in place.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat arrangement for a vehicle comprising a longitudinal axis and at least one longitudinal aisle, comprising:
   first and second partition walls positioned in spaced apart relation forming an area therebetween, each of the first and second partition walls including at least one portion angled relative to the longitudinal aisle, each of the first and second partition walls having one end positionable proximate the longitudinal aisle, and the area formed between the first and second partition walls directly accessible from the longitudinal aisle;
   a passenger seat positioned in the area and oriented generally facing the longitudinal aisle; and
   a guide mechanism positioned in the area, separate from and coupled to the passenger seat, for guiding movement of the passenger seat within the area and relative to the longitudinal aisle;
   wherein the passenger seat is configured to travel along the guide mechanism between a first position at a first end of the area in which the passenger seat is positioned distal from the longitudinal aisle, and a second position at a second end of the area in which the passenger seat is positioned proximate the longitudinal aisle; and
   wherein the guide mechanism is configured to impart rotation of the passenger seat such that, relative to the longitudinal aisle, an angle of the passenger seat when in the first position is different from the angle of the passenger seat when in the second position.

2. The passenger seat arrangement according to claim 1, wherein the at least one portion of each of the first and second partition walls is fixed in its respective angle relative to the longitudinal aisle, such that an access opening formed between the one end of each of the first and second partition walls positionable proximate the longitudinal aisle has a fixed width, and wherein the access opening provides access from the longitudinal aisle to the area.

3. The passenger seat arrangement according to claim 1, wherein the guide mechanism comprises at least one curved floor track positioned in the area, and wherein the passenger seat is movably coupled to the at least one curved floor track such that the passenger seat is configured to track along the at least one curved floor track between the first and second positions.

4. The passenger seat arrangement according to claim 3, wherein:
   each of the first and second partition walls includes a first portion and a second portion angled relative to the first portion;
   the first portion of each of the first and second partition walls is positionable at a first angle relative to the longitudinal aisle and the second portion of each of the first and second partition walls is positionable at a second angle relative to the longitudinal aisle, wherein the second angle is greater than the first angle;
   the at least one floor curved track includes a first portion and a second portion angled relative to the first portion; and
   the first portion of the at least one curved floor track is positioned at a first angle relative to the longitudinal aisle and the second portion of the at least one curved floor tack is positioned at a second angle relative to the longitudinal aisle, wherein the second angle is greater than the first angle.

5. The passenger seat arrangement according to claim 1, wherein the guide mechanism comprises first and second curved wall tracks coupled to the respective first and second partition walls, and wherein the passenger seat is movably coupled to the first and second curved walls tracks such that the passenger seat is configured to track along the first and second curved wall tracks between the first and second positions.

6. The passenger seat arrangement according to claim 5, wherein:
each of the first and second partition walls includes a first portion and a second portion angled relative to the first portion;
the first portion of each of the first and second partition walls is positionable at a first angle relative to the longitudinal aisle and the second portion of each of the first and second partition walls is positionable at a second angle relative to the longitudinal aisle, wherein the second angle is greater than the first angle;
each of the first and second curved wall tracks includes a first portion and a second portion angled relative to the first portion; and
the first portion of each of the first and second wall tracks is positioned at a first angle relative to the longitudinal aisle and the second portion of each of the first and second wall tracks is positioned at a second angle relative to the longitudinal aisle, wherein the second angle is greater than the first angle.

7. The passenger seat arrangement according to claim 1, wherein the passenger seat is configured to transition between an upright sitting position and a reclined sitting position, and wherein the passenger seat is configured to travel along the guide mechanism when the passenger seat is in the upright sitting position or in the reclined sitting position.

8. The passenger seat arrangement according to claim 1, wherein the passenger seat is coupled to the guide mechanism via a swivel mechanism for rotating the passenger seat relative to the guide mechanism.

9. The passenger seat arrangement according to claim 1, wherein the passenger seat is configured rest in an intermediate position between the first and second positions.

10. A passenger seat arrangement for an aircraft passenger cabin, comprising:
an aisle;
first and second partition walls positioned in spaced apart relation forming a first area therebetween, each of the first and second partition walls including at least one portion angled relative to the aisle, each of the first and second partition walls having one end positioned proximate the aisle, and the first area formed between the first and second partition walls directly accessible from the aisle;
a first passenger seat positioned in the first area and oriented generally facing the aisle;
a guide mechanism positioned in the first area, separate from and coupled to the first passenger seat, for guiding movement of the passenger seat within the first area and relative to the aisle;
a third partition wall positioned parallel and in spaced apart relation to the first partition wall, the third and first partition walls forming a second area therebetween, the third partition wall including at least one portion angled relative to the aisle, the third partition wall having one end positioned proximate the aisle, and the second area formed between the third and first partition walls directly accessible from the aisle;
a second passenger seat positioned in the second area and oriented generally facing the aisle;
wherein the first passenger seat is configured to travel along the guide mechanism between a first position at a first end of the area in which the first passenger seat is positioned distal from the aisle and a second position at a second end of the area in which the first passenger seat is positioned proximate the aisle, through a third position between the first end and the second end in which the first and second passenger seats are positioned laterally adjacent and aligned;
wherein the second seat is fixed in position within the second area; and
wherein the guide mechanism is configured to impart rotation of the passenger seat such that, relative to the aisle, an angle of the passenger seat when in the first position is different from the angle of the passenger seat when in the second position, and the angle of the passenger seat when in the third position is different from the angle of the passenger seat when in the second position.

11. The passenger seat arrangement according to claim 10, wherein:
the at least one portion of each of the first, second and third partition walls is fixed in its respective angle relative to the longitudinal aisle;
a first access opening is formed between the one end of each of the first and second partition walls positioned proximate the aisle and has a fixed width, and the first access opening provides access from the aisle to the first area; and
a second access opening is formed between the one end of each of the third and first partition walls positioned proximate the aisle and has a fixed width, and the second access opening provides access from the aisle to the second area.

12. The passenger seat arrangement according to claim 10, wherein:
the guide mechanism comprises at least one curved floor track positioned in the first area;
the first passenger seat is movably coupled to the at least one curved floor track such that the first passenger seat is configured to travel along the at least one floor track between the first and second positions through the third position; and
the first passenger seat is configured to travel between the first and second positions through the third position while remaining in an upright sitting position.

13. The passenger seat arrangement according to claim 12, wherein:
each of the first and second partition walls includes a first portion and a second portion angled relative to the first portion;
the first portion of each of the first and second partition walls is positioned at a first angle relative to the aisle and the second portion of each of the first and second partition walls is positioned at a second angle relative to the longitudinal aisle, wherein the second angle is greater than the first angle;
the at least one curved floor track includes a first portion and a second portion angled relative to the first portion; and the first portion of the at least one curved floor track is positioned at a first angle relative to the aisle and the second portion of the at least one curved floor tack is positioned at a second angle relative to the aisle, wherein the second angle is greater than the first angle.

14. The passenger seat arrangement according to claim 1, wherein:
    the guide mechanism comprises first and second curved wall tracks coupled to the respective first and second partition walls;
    the first passenger seat is movably coupled to the first and second curved walls tracks such that the first passenger seat is configured to track along the first and second curved wall tracks between the first and second positions through the third position;
    the first passenger seat does not change in angle relative to the aisle when traveling between the first and third positions; and
    the first passenger seat is configured to travel between the first and second positions through the third position while remaining in an upright sitting position.

15. The passenger seat arrangement according to claim 14, wherein:
    each of the first and second partition walls includes a first portion and a second portion angled relative to the first portion;
    the first portion of each of the first and second partition walls is positioned at a first angle relative to the aisle and the second portion of each of the first and second partition walls is positioned at a second angle relative to the aisle, wherein the second angle is greater than the first angle;
    each of the first and second curved wall tracks includes a first portion and a second portion angled relative to the first portion;
    the first portion of each of the first and second curved wall tracks is positioned at a first angle relative to the aisle and the second portion of each of the first and second curved wall tracks is positioned at a second angle relative to the aisle, wherein the second angle is greater than the first angle.

\* \* \* \* \*